United States Patent [19]

Yasuda et al.

[11] Patent Number: 4,981,713

[45] Date of Patent: Jan. 1, 1991

[54] LOW TEMPERATURE PLASMA TECHNOLOGY FOR CORROSION PROTECTION OF STEEL

[75] Inventors: Hirotsugu Yasuda, Columbia, Mo.; Duck J. Yang, Wilmington, Del.

[73] Assignee: E. I. Du Pont de Nemours and Company, Wilmington, Del.

[21] Appl. No.: 480,355

[22] Filed: Feb. 14, 1990

[51] Int. Cl.$^5$ .............................................. B05D 3/06
[52] U.S. Cl. ...................................... 427/38; 427/47; 427/295
[58] Field of Search ...................... 427/38, 37, 47, 295

[56] References Cited

U.S. PATENT DOCUMENTS

| | | | |
|---|---|---|---|
| 3,582,604 | 6/1971 | Bykhovsky | 219/121 |
| 3,723,289 | 3/1973 | Boom | 204/312 |
| 3,823,489 | 7/1974 | Boom | 34/242 |
| 3,824,398 | 7/1974 | Boom | 250/325 |
| 3,837,894 | 9/1974 | Tucker, Jr. | 117/70 A |
| 4,095,003 | 6/1978 | Weatherly et al. | 427/34 |
| 4,292,397 | 9/1981 | Takeuchi et al. | 430/303 |
| 4,428,847 | 1/1984 | Boxall et al. | 502/101 |
| 4,568,562 | 2/1986 | Phillips | 427/40 |
| 4,737,379 | 4/1988 | Hudgens et al. | 427/39 |

FOREIGN PATENT DOCUMENTS 51-83030 7/1976 Japan.

OTHER PUBLICATIONS

"Combined Deposition Process/Processes Create New Composites" *Research and Development*, Oct. 1989.
"Surface Coating of Metals in a Glow Discharge" *Journal of the Oil and Colour Chemists Association*, vol. 48, 1965.
"Plasma Polymerization of Combined Energy Input for Protective Coating of Metal" *Journal of Applied Polymer Science: Applied Polymer Symposium 42*, 233 (1988).
"Plasma Polymerization by Magnetron Glow Discharge. I. Effect of Magnetic Field on Breakdown of Monomers in Low Pressure", J. Vac. Sci. Technol. A 7 (2) Mar./Apr. 1989.
"Plasma Polymerization by Magnetron Glow Discharge. III. Effect of Magnetic Field on Sputtering Characteristics of Electrode Materials", J. Vac. Sci. Technol. A 7 (5), Sep./Oct. 1989.
*Recent Developments in Surface Coating and Modification Processes*, Principles of Ion Plating, presented 10/10/85 at Seminar by Tribology Group of Institution of Mechanical Engineers, published by Mechanical Engineering Publications Limited.

*Primary Examiner*—Bernard Pianalto
*Attorney, Agent, or Firm*—John M. Lynn

[57] ABSTRACT

This invention relates to the use of plasma technology for coating thin polymer films on steel. The process utilizes DC power, system pressures of 0.01–1.0 torr, the steel substrate is made the cathode, and the anodes are equipped with magnetic enhancement. The result is a uniform, pin-hole free, dense organic coating. Furthermore, there is minimal deposition of the organic film on the anodes or interior of the chamber.

10 Claims, 2 Drawing Sheets

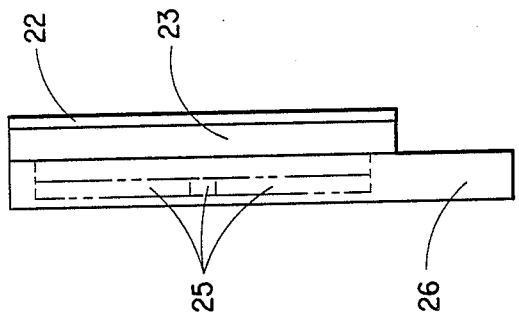
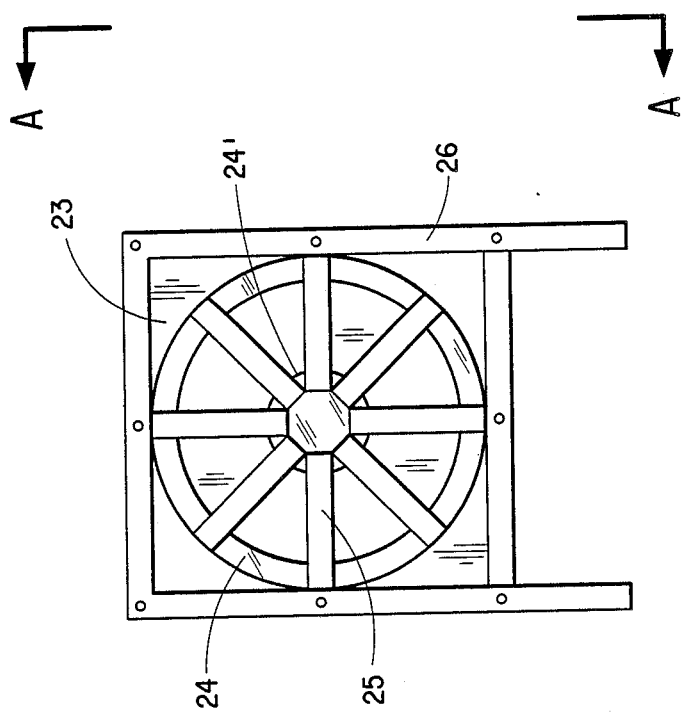

LOW TEMPERATURE PLASMA TECHNOLOGY FOR CORROSION PROTECTION OF STEEL

FIELD OF THE INVENTION

This invention relates to the use of low temperature plasma technology for the corrosion protection steel. Our novel process involves plasma thin film deposition of an organic vapor or an organometallic vapor. The deposition process is conducted at very low pressure, ambient temperature, utilizes DC power with the steel substrate as the cathode, and the anodes are equipped with magnetic enhancement (magnetron).

BACKGROUND

The corrosion protection of steel substrates is an important industrial process. This process is important for many industries including the automotive industry, steel industry and so forth. Currently the most common methods of corrosion protection of steel substrates are galvanizing, zinc phosphate, electrodeposition of organics, conventional spray or dip priming, oil coating and so forth. However, in the automotive industry and other high performance uses these methods have the following problems: (1) pollution in the form of Volatile Organic Content (VOC), (2) excessive waste disposal, (3) inadequate coverage of recessed areas, and (5) inadequate long term corrosion protection performance.

It is known that plasma deposition of thin films gives a very dense layer of film, with uniform deposition, no "pin holes", and good edge coverage. Furthermore this process does not use solvents so there is no VOC problem. Most of the work in the plasma deposition area has been restricted to small objects (e.g. microelectronic components). Plasma processing for larger objects has been used primarily for plastic substrates.

It has been disclosed that it is possible to deposit thin polymer films on metal substrates. The plasma deposition of organic films on metal is generally described in an article entitled "Surface Coating of Metals in a Glow Discharge" in the *Journal of the Oil and Colour Chemists Association*, Vol. 48, 1965 (hereinafter, the "Glow Discharge" article) This article describes in general terms a method of coating a steel substrate with thin polymer films derived from organic vapors (styrene, acrylates, butadiene, diethyl silicate, and tetraethyl orthosilicate) using glow discharge (i.e. plasma deposition) for short term protection of the steel substrate. The process utilizes AC power and system pressures of 1-5 torr.

Professor Yasuda disclosed some basics of plasma energy level, the deposition of organosilanes, and oxygen cleaning of the steel substrate in an article entitled *Plasma Polymerization at Combined Energy Input For Protective Coating of Metal*, published in the "Journal of Applied Polymer Science: Applied Polymer Symposium 42, 233 (1988). However, this article discloses using only an AC power source.

Professor Yasuda also disclosed the use of magnetrons in plasma polymerization in the article *Plasma Polymerization by Maonetron Glow Discharge. I.Effect of Magnetic Filed on Breakdown of Monomers in Low Pressure*, published in J. Vac. Sci. Technol. A 7 (2), Mar.-/Apr. 1989. However, this article also discusses only AC power not DC power. When magnetrons were used in DC power systems it was previously believed that magnetrons could function only as a cathode and not as an anode (See, *Thin Film Processes*, edited by Vossen and Kern, 1978, page 76, first paragraph).

The use of polysiloxanes as the deposited film in glow discharge for corrosion protection of steel is also disclosed in Japanese Patent No. Sho 51 [1976]-83030 issued to Aoki (hereinafter the Aoki patent). This disclosure also teaches the use of AC power. It is not believed that the Aoki patent technology would have practical utility as a long term corrosion protection method for automotive steel because of adhesion problems.

What is needed is a method of depositing a thin organic film layer on a variety of different steel substrates to give improved corrosion resistance. The method must result in a film having good adhesion, good edge coverage, good barrier properties and the method must have minimal VOC problems, minimal deposition on the cathode and chamber walls and minimal waste disposal.

SUMMARY OF THE INVENTION

It has been discovered that improved corrosion resistance of steel can be realized if the following method is followed: (1) using DC power from 100-2000 volts preferably 300 to 1200 volts for the plasma deposition; (2) making the steel substrate the cathode; and (3) having the anode(s) equipped with magnetic enhancement (i.e. magnetron). This results in excellent coverage (good edge coverage and no pin holes), minimal deposition on the anode or chamber wall (this is a problem with AC), and a higher plasma film deposition rate than can be realized with AC power.

BRIEF DESCRIPTION OF THE DRAWINGS

FIG. 2 shows a frontal view of an anode which has been equipped with a magnetron.

FIG. 2A shows a side view of the anode in FIG. 2.

DETAILED DESCRIPTION OF THE INVENTION

Figure 1:
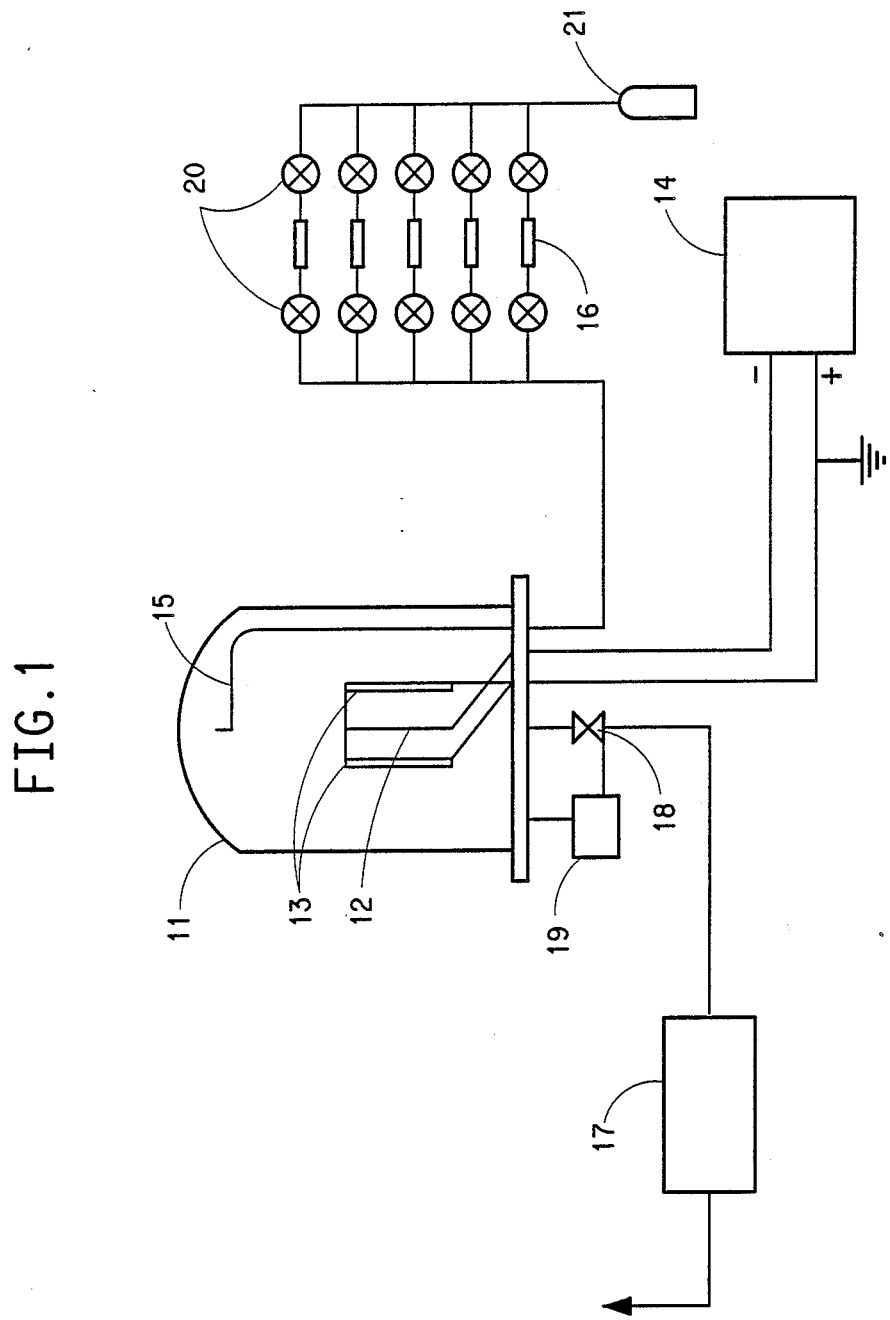
FIG. 1 shows a schematic of our deposition system, including the vacuum chamber, the electrodes, the power source, related piping and so forth.

It has been found that a simple coating system which involves plasma treatment works as an effective way of protecting a steel surface from corrosion. Our novel system is usable with a variety of different types of steel (e.g. bare steel, cold rolled steel, stainless steel, galvanized steel, phosphated steel and so forth) in a variety of different sizes and shapes. For example the shapes could be a preassembled autobody, autobody parts, rolls, coils, sheets and so forth.

Our novel deposition process involves coating the steel substrate with a thin layer or layers of plasma formed organic polymer in a highly evacuated chamber.

PLASMA POLYMER DEPOSITION

The basic scientific concepts of plasma deposition are described in Professor Yasuda's book entitled *Plasma Polymerization*, published by Academic Press in 1985. Note: Before the plasma deposition process it may be beneficial to pretreat (clean) the steel substrate with inert or reactive plasma gas. This plasma gas pretreatment step preferably takes place in the same chamber as the plasma polymer deposition with the system set up as described below for plasma deposition. See the Examples for the plasma gas pretreatment parameters. A preferred plasma pretreatment gas is oxygen, although others such as air, hydrogen, nitrogen, water vapor, argon or their mixtures are also potentially usable.

The overall diagram of our preferred system is shown in FIG. 1. (Note: This figure is only illustrative and one skilled in the art could design a number of effective systems with which to practice our invention). FIG. 1 shows vacuum chamber 11, cathode 12 (which is the steel substrate), anodes 13, power supply 14, plasma gas feeding line 15, plasma gas flow controllers 16 and vacuum pump 17. The negative pole of DC power supply 14 is connected to the steel substrate to form cathode 12. The grounded positive pole of DC power supply 14 is connected to anodes 13. As shown in FIG. 2, anodes 13 are equipped with a superimposed magnetic field (magnetron). When the magnetron is used in the plasma deposition step the magnetic field at the magnet surface should be between 10–10,000 Gauss, preferably 100–1000 Gauss and most preferably 700 to 900 Gauss. Magnetrons are well known in the art and are generally disclosed in the *Thin Film Processes* book (cited above) at Part II-2 and Part II-4. As will be apparent to one skilled in the art there are numerous ways to superimpose the magnetic field.

FIG. 2 is a detail of the anode arrangement that we used in our examples. (The exact dimensions are detailed in the Example Section). Anode 13 is composed of aluminum plate 23; titanium plate 22 (which is attached on inner side of aluminum plate 23); iron ring 24 and circular iron plate 24' (which are attached on the backside of aluminum plate 23); and 8 permanent magnetic bars 25 (which are attaced on circular iron plate 24 and iron ring 24' with the south poles facing the center point). The preferred magnetic field strength ranges from 700–900 gausses. The whole electrode (anode) 13 is then supported by ceramic materials 26. As will be apparent to one skilled in the art, the anode configuration can be varied as well as the materials of construction of the anode. For instance, the titanium plate 23 or aluminum plate 22 could be other paramagnetic materials with low sputtering yield, and the circular iron plate 24' or iron ring 24 could be other ferromagnetic materials.

To prepare for the plasma deposition step the steel substrate is hung at the center between two parallel anodes 13 and the steel substrate is connected to the negative pole of DC power supply 14 so that the steel substrate becomes cathode 12. (In a commercial system it would also be possible to mount the anode(s) on robotic arms in order to cover complicated shapes The number, size, and shape of anodes and their positioning would change according to the desired use).

Vacuum pump 17 is then used to evacuate vacuum chamber 11 until the system pressure is lower than 1 millitorr. The system pressure is read from pressure gauge 19. The plasma deposition gas is fed from plasma deposition gas source 21 through feeding line 15 into vacuum chamber 11, at the desired flow rate, by using the appropriate flow controller 16. (Note: There are numerous flow control valves 16 and stop valves 20 in order to have the flexibility to change the plasma deposition gas being deposited). While feeding the plasma deposition gas into vacuum chamber 11 it is important to keep the pressure in the chamber at between 1 millitorr to 1 torr, preferably 10 millitorr to 500 millitorr and most preferably 20 millitorr to 100 millitorr. The system pressure, independent of gas flow rate, is controlled by throttle valve 18 which uses the reading from pressure gauge 19.

The operation parameter of low temperature plasma processes can be given by the energy input level per mass of plasma gas, W/FM., given by joule/kg, where W is electric power input (W =joule/second) into the system, and F is the molar flow rate and M is the molecular weight of gas. (FM represents the mass flow rate.) According to this relationship, the flow rate to be employed is dependent on the power input and molecular weight of gas. This energy input per mass should be between 1 MegaJoule per Kilogram and 1 GigaJoule per Kilogram depending upon the plasma deposition gas and power level used.

Once the desired flow rate and system pressure is obtained DC power source 14 is turned on to initiate the plasma state and then adjusted to the desired power level. This power level varies dependent on flow rate, size of substrate, distance from cathode to anode, molecular weight of the plasma gas, pressure and so forth. The plasma deposition should continue for a desired period of time in order to obtain the desired film properties and thickness. The film thickness can range between 10 Angstroms to 10 micrometers, preferably 10 Angstroms to 5,000 Angstroms and most preferably 10 Angstroms-3000 Angstroms. The deposition time is typically from 1 second to 20 minutes, preferably 30 seconds to 10 minutes and most preferably 30 seconds to 2 minutes. Control of the deposition process may also be based upon the "(energy input) multiplied by (deposition time) divided by (mass)". This parameter should be kept between 0.5 GigaJoule-Second per Kilogram and 50 GigaJoule-Sec per Kilogram. After the desired period of time, DC power supply 14 is turned off and the plasma gas flow should be stopped using the appropriate plasma gas shut off valve 20. Plasma deposition that is efficient for corrosion resistance is dependent on film adhesion, film barrier properties and film thickness.

Virtually any organic compound which can be vaporized can be deposited using our novel method. Examples include organosilanes, hydrocarbons, and organometallics. Our preferred plasma deposition gases are organosilanes. Our most preferred is trimethylsilane (TMS). Alternative organosilanes include but are not limited to dimethylsilane (DMS), tetramethylsilane, trimethylethoxysilane, methyltrimethoxysilane, hexamethyldisiloxane or other organosilanes which contain either silicon, oxygen, carbon, phosphorous, or hydrogen or their mixtures, and with or without vinyl unsaturation. Other hydrocarbons containing carbon, hydrogen, oxygen, floride (e.g. methane, ethylene, acetylene, acrylic acid, butadiene, and fluorocarbons like tetrafluoethylene) could be used. In addition, organometal coupounds containing antimony, phophorous, zinc, titanium, zirconium, aluminum, antimony, chromium, tin, or other metals or their mixtures could also be used. Examples of organometallic compounds are trimethylphosphine, trimethylphosphate, trimethylphosphite, trimethylfluorosilane, diethylzin, tetraethyltin, trimethyl aluminum tetrabutyl titanate.

It may also be advantageous to use a carrier gas for the plasma deposition gas (especially if the plasma deposition precursor is a high boiler). The carrier gas can be inert gases such as argon and helium or reactive gases such as oxygen or nitrogen (or mixtures thereof)

Liquid or even solid compounds can also be used as the plasma deposition compound if enough vapor pressure can be created for the compounds to feed into the vacuum system. Gas materials at room temperature are preferred for the purpose of maintaining constant flow rate.

After deposition of the thin plasma film other layers may be applied over it. These include primers, primer surfacers, monocoats, basecoat/clearcoat or any other type of topcoat system known in the art.

EXAMPLES

All of the examples, unless otherwise noted, were run as generally described in the Detailed Description Section infra More specific information concerning the Examples are set out below:

(1) Steel substrate: size (4"×6"×0.032") which has been pre-cleaned with solvent if it was oiled.
(2) Vacuum chamber: Pyrex ® bell-jar of 18" in diameter and 30" in height.
(3) Power Source:
External DC power supply (available from Advanced Energy Industries, Inc. as model MDX-1K)
(4) Electrode Description:
Cathode is the steel substrate described above positioned between two anodes;
Two anodes as shown in FIG. 2. Each anode is composed of aluminum plate 23 (7"×7"×¼"), a titanium plate 21 (7"×7"×1/16") which is attached on inner side of aluminum plate 23, an iron ring 24 (7" in outer diameter, 5.5" in inner diameter, 1/16" thick) and iron plate 24 (2" in diameter, 1/16" thick) which are attached on the backside of aluminum plate 23, and 8 pieces of permanent magnetic bars 25 (3"×½"×¼") which are attaced on the iron plate 24 and iron ring 24 with the south poles facing the center point. The magnetic field strength ranges from 700–800 gauses. The whole electrode (anode) 13 is then supported by ceramic materials 26;
The cathode is positioned between the two parallel anodes with the titanium side facing the cathode at a distance of 2".
(5) Vacuum Pumping Mechanism: A mechanical booster pump (available from Shimadzu Corporation as model MB-100F) in series with a mechanical rotary pump (available from Sargent-Welch Scientific Company as model 1376).
(6) Pressure gauge: A capacitance barometer (available from MKS Instruments as model 220BA).
(7) Throttle valve (available from MKS Instruments as model 253A) and throttle valve controller (also available from MKS Instrument as model 252A).
(8) Flow controllers: Mass flow controllers (available from MKS Instruments as model 1259B).

DESCRIPTION OF CORROSION RESISTANCE TEST (SCAB TEST)

The test panels are scribed. The scribe line is at the center of the panel and is about 3 inches long. These scribed panels are then subjected to the following test cycle:

Monday through Friday:
15 minute immersion in 5% NaCl solution.
75 minute drying in air at room temperature.
22 hour and 30 minute exposure at 85% R.H. and 60° C. environment.

Saturday and Sunday:
Samples remain in humidity cabinet (85% R.H., 60° C.). Samples were examined occasionally. After completion of the Scab corrosion test, the test panels were removed from the chamber and rinsed with warm water. The samples were examined visually for failure such as corrosion, lifting, peeling, adhesion loss, or blistering. To evaluate the scribe line corrosion creepback (loss of adhesion between primer and steel), the distance between the scribe line and the unaffected primer is measured. The average of multiple measurements is calculated.

EXAMPLE I

Bare Steel Substrate/$O_2$ Plasma Pretreatment/Plasma Deposition

Substrate: cleaned cold-rolled steel coupon. (Available from ACT Corporation as product designation GMC 92A)

$O_2$ plasma pretreatment conditions: DC power was 12 watts and 600–800 volts; energy input per mass was 0.25 gigaJoules per kilogram; oxygen gas flow rate was 2 standard cubic centimeter per minute (sccm); system pressure was 50 milliTorrs; and power duration was 2 minutes.

Deposition of plasma poly(tris(trimethylsilyl)phosphite) using tris(trimethylsilyl)phosphite (TTMSP) vapor: DC power 10 watts and 500–700 volts; energy input per mass was 44 megaJoules per Kilogram; TTMSP vaor flow rate was 1.2 standard cubic centimeter per minute (sccm) which was regulated using a fine needle valve; system pressure was 50 milliTorrs and power duration was 2 minutes.

The sample was tested for corrosion resistance by placing the sample in the humidity chamber at 60° C. and 85% R.H. for 5 days. The dry and wet adhesion were good based on a tape test (ASTM D3359) Little or minor pitting corrosion appeared on the plasma-coated sample, while the uncoated coupon has severe pittings.

EXAMPLE II

Zinc-phosphated Chromic Acid Rinsed Steel/$O_2$ Plasma Pretreatment/Plasma Deposition Substrate: Zinc-phosphated chromic acid rinsed steel coupon (available from ACT Corp. product designation GMC 92C; C168 C20 DIW)

$O_2$ plasma pretreatment conditions: DC power was 12 watts and 600–800 volts; energy input per mass was 0.25 gigaJoules per kilogram; oxygen gas flow rate was 2 standard cubic centimeter per minute (sccm); system pressure was 50 milliTorrs; and power duration was 2 minutes.

Deposition of plasma poly(trimethylsilane) using trimethylsilane (TMS) gas: DC power 5 watts and 700–900 volts; energy input per mass was 60 megaJoules per Kilogram; TMS vapor flow rate was 1.5 standard cubic centimeter per minute (sccm), system pressure was 50 milliTorrs and power duration was 4 minutes.

The sample was then subjected to the Scab corrosion test described above for 2 days. The dry and wet adhesion were good based on a tape test (ASTM D3359). Minor pitting corrosion appeared on the plasma-coated samples, while the uncoated coupon has severe pittings (iron oxide rust color). Creepage along the scirbed line was not evident since the corrosion pattern was uniform pittings over the surface area.

EXAMPLE III

Zinc-phosphated Chromic Acid Rinsed Galvanized Steel/O₂ Plasma Pretreatment/Plasma Deposition Substrate: Zinc-phosphated chromic acid rinsed galvanized steel coupon (available from ACT Corp. product designation GMC 90E; C168 C20 DIW; Electro Glv70/70)

O₂ plasma pretreatment conditions: DC power was 12 watts and 600–800 volts; energy input per mass was 0.25 gigaJoules per kilogram; oxygen gas flow rate was 2 standard cubic centimeter per minute (sccm); system pressure was 50 milliTorrs; and power duration was 2 minutes.

Deposition of plasma poly(hexamethyldisiloxane) using hexamethyldisiloxane (HMDSO) vapor : DC power was 12 watts and 400–600 volts; energy input per mass was 15 megaJoules per Kilogram; HMDSO vapor flow rate was 6.5 standard cubic centimeter per minute (sccm) which was regulated using a fine needle valve; system pressure was 200 milliTorrs and power duration was 2 minutes.

The sample was then subjected to the Scab corrosion test described above for 1 week. The dry and wet adhesion were good based on a tape test (ASTM D3359). Little or minor pitting corrosion appeared on the plasma-coated samples, while the uncoated coupon has severe uniform pittings (white zinc oxide spots). Creepage along the scribed line was not evident since the corrosion pattern was uniform pittings over the surface area.

EXAMPLE IV

Zinc-phosphated Chromic Acid Rinsed Steel/O₂ Plasma Pretreatment/Plasma Deposition Substrate: Zinc-phosphated chromic acid rinsed steel coupon. (Available from ACT Corp. product designation GMC 92C; C168 C20 DIW).

O₂ Plasma pretreatment conditions: DC power was 12 watts and 600–800 volts; energy input per mass was 0.25 gigaJoules per kilogram; oxygen gas flow rate was 2 standard cubic centimeter per minute (sccm); system pressure was 50 milliTorrs; and power duration was 2 minutes.

Deposition of plasma poly(butadiene) using butadiene gas: DC power 2 watts and 600–630 volts; energy input per mass was 33 megaJoules per Kilogram; butadiene gas flow rate was 1.5 standard cubic centimeter per minute (sccm); system pressure was 50 milliTorrs and power duration was 2 minutes.

The sample was then subjected to the Scab corrosion test described above for 1 days. The dry and wet adhesion were good based on a tape test (ASTM D3359). Uniform pitting corrosion appeared on the plasma-coated samples, while the uncoated coupon has severe pittings (iron oxide rust color). Creepage along the scribed line was not evident since the corrosion pattern was uniform pittings over the surface area.

EXAMPLE V

Zinc-phosphated Chromic Acid Rinsed Steel/O₂ Plasma Pretreatment/Plasma Depositions Substrate: Zinc-phosphated chromic acid rinsed steel coupon. (Available from ACT Corp. product designation GMC 92C; C168 C20 DIW).

O₂ plasma pretreatment conditions DC power was 12 watts and 600–800 volts; energy input per mass was 0.25 gigaJoules per kilogram; oxygen gas flow rate was 2 standard cubic centimeter per minute (sccm); system pressure was 50 milliTorrs; and power duration was 2 minutes.

After the surface pretreatment, the substrate was coated with a plasma poly(trimethylsilane) film followed by a subsequent coating of plasma poly(butadiene).

Deposition of plasma poly(trimethylsilane) using trimethylsilane (TMS) gas: DC power 2 watts and 600–700 volts; energy input per mass was 24 megaJoules per Kilogram; TMS vapor flow rate was 1.5 standard cubic centimeter per minute (sccm); system pressure was 50 milliTorrs and power duration was 2 minutes.

Deposition of plasma poly(butadiene) using butadiene gas: DC power 2 watts and 630–690 volts; energy input per mass was 33 megaJoules per Kilogram; butadiene gas flow rate was 1.5 standard cubic centimeter per minute (sccm); system pressure was 50 milliTorrs and power duration was 2 minutes.

The sample was then subjected to the Scab corrosion test described above for 1 days. The dry and wet adhesion were good based on a tape test (ASTM D3359). Minor pitting corrosion appeared on the plasma-coated samples, while the uncoated coupon has severe pittings (iron oxide rust color) Creepage along the scribed line was not evident since the corrosion pattern was uniform pittings over the surface area.

We claim:

1. In a method of coating a steel substrate of the type in which a thin organic film is deposited on the steel substrate using plasma deposition, wherein the improvement comprises:
    (a) depositing the thin organic film in a low pressure atmosphere of less than 1 torr;
    (b) using a direct current power source with a cathode and at least one anode;
    (c) attaching the steel substrate to the cathode of the direct current power source; and
    (d) equipping at least one of the anodes with magnetic enhancement.

2. The method of claim 1 wherein depositing of the thin organic film occurs at a low pressure atmosphere of between 10 millitorr and 500 millitorr.

3. The method of claim 1 wherein the maximum magnetic field at the surface of the anode is 100 to 10,000 Gauss.

4. The method of claim 1 wherein the organic film is selected from the group consisting of plasma polymers of organosilane; plasma polymers of hydrocarbons; and plasma polymers of organometallic compounds.

5. The method of claim 4 wherein the organic film is a plasma polymer of organosilane containing either silicone, oxygen, carbon, phosphorous, hydrogen or their mixtures.

6. The method of claim 5 wherein the organosilane is trimethoxysilane, dimethylsilane, tetramethylsilane, trimethylethoxysilane, methyltrimethoxysilane, or hexamethyldisiloxane.

7. The method of claim 4 wherein the organic film is a plasma polymer of hydrocarbon containing either carbon, hydrogen, oxygen, flourine or mixtures thereof.

8. The method of claim 7 wherein the hydrocarbon is methane, ethylene, butadiene, acrylic acid or tetrafluoroethylene.

9. The method of claim 4 wherein the organic film is a plasma polymer of organometallic compounds containing either hydrocarbon, carbon, oxygen, fluorine, phosphourous, zinc, titanium, antimony, aluminum, zirconium, tin, chromium or mixtures thereof.

10. The method of claim 9 wherein the organometallic compound is trimethylphosphine, trimethylphosphate, trimethylphosphite, trimethylfluorosilane, diethyltin, tetraethyltin, tri-methyl aluminum, or tetrabutyl titanate.

* * * * *